United States Patent [19]
Miyoshi et al.

[11] Patent Number: 5,363,384
[45] Date of Patent: Nov. 8, 1994

[54] AUDIO SIGNAL DEMODULATION CIRCUIT

[75] Inventors: Toshihiro Miyoshi; Naoji Okumura, both of Osaka; Hisashi Arita, Hyogo; Kenji Ishikawa, Osaka; Yuichi Ninomiya; Yoshimichi Ohtsuka, both of Kawasaki; Tadashi Kawashima, Tokyo; Takushi Iwamoto, Matsuyama, all of Japan

[73] Assignees: Matsushita Electric Industrial, Co., Ltd.; Nippon Hoso Kyokai, both of Tokyo, Japan

[21] Appl. No.: 164,996

[22] Filed: Dec. 10, 1993

Related U.S. Application Data

[63] Continuation of Ser. No. 971,260, Nov. 19, 1992, abandoned, which is a continuation of Ser. No. 499,352, Aug. 6, 1990, abandoned.

[30] Foreign Application Priority Data

Oct. 24, 1988 [JP] Japan .................. 63-267452

[51] Int. Cl.$^5$ .................. H04N 5/76; G06F 11/00
[52] U.S. Cl. .................. 371/31; 348/571
[58] Field of Search .................. 371/31, 38.1, 39.1, 371/40.1; 358/167, 198; 307/542, 542.1, 543

[56] References Cited

U.S. PATENT DOCUMENTS

| | | | |
|---|---|---|---|
| 4,291,405 | 9/1981 | Jayant et al. | 371/31 |
| 4,375,581 | 3/1983 | Jayant | 371/31 |
| 4,377,823 | 3/1983 | Mycynek | 358/167 |
| 4,430,736 | 2/1984 | Scholz | 371/31 |
| 4,495,523 | 1/1985 | Ozawa | 358/167 |
| 4,567,591 | 1/1986 | Gray et al. | 370/109 |
| 4,593,392 | 6/1986 | Kouyama | 371/31 |
| 4,718,067 | 1/1988 | Peters | 371/31 |
| 4,829,523 | 5/1989 | Bretl | 371/31 |

FOREIGN PATENT DOCUMENTS

| | | |
|---|---|---|
| 0264986 | 9/1987 | European Pat. Off. . |
| 53-48452 | 1/1978 | Japan . |
| 57-50308 | 3/1982 | Japan . |
| 60-24740 | 2/1985 | Japan . |
| 61276434 | 5/1985 | Japan . |
| 61-35632 | 2/1986 | Japan . |

OTHER PUBLICATIONS

Kaoru Watanabe et al, "NI-DPCM Coding of HDTV Sound Signal for Baseband Multiplexing," *NHK Science and Technical Research Laboratories*, Mar. 1962, p. 1384.

Yuichi Ninomiya et al, "A Single Channel Transmission System for HD-TV Satellite Broadcasting," *NHK Science and Technical Research Laboratories*, vol. J68, No. 4, (1985), pp. 647–654.

*Primary Examiner*—Charles E. Atkinson
*Attorney, Agent, or Firm*—Mason, Fenwick & Lawrence

[57] ABSTRACT

A digital audio signal demodulation circuit comprises a synchronous detection circuit (18) and a muting circuit (17) for muting the output from an interpolation circuit (16) using a synchronization lock signal generated from the synchronous detection circuit (18) when synchronization has been lost. The differential signal output from the interpolation circuit (16) is muted by the muting circuit (17) and thereafter integrated by an integration circuit (19). Thus, an audio signal with high sound quality can be demodulated without producing interruption noise even when synchronization has been lost or forcible muting is done.

6 Claims, 5 Drawing Sheets

AUDIO SIGNAL DEMODULATION CIRCUIT

This application is a continuation of U.S. patent application Ser. No. 07/971,260, filed Nov. 4, 1992 (abandoned concurrently with the present filing), which was a continuation of U.S. patent application Ser. No. 07/499,352, filed Aug. 6, 1990 (now abandoned).

TECHNICAL FIELD

The present invention relates to an audio signal demodulation circuit for use in a high definition television ("high vision") receiver, or the like.

BACKGROUND ART

The high definition television ("high vision") intends to provide new charms such as forceful and attendant feelings which cannot be obtained by the existing television broadcasting; these charms are given by display of a high definition television image on a large-scale wide screen and digital PCM sound.

As a method for band-compressing a high definition television signal, the MUSE (Multiple Sub-Nyquist Sampling Encoding) system has been proposed by Nippon Hoso Kyokai (NHK) (Y. Ninomiya et al "KOHINI TEREBI NO EISEI 1 CHANNEL DENSO HOSIKI" SINGAKURONSI Vol. J68 - D. No. 4 PP. 647–654 (1985); WATANABE, TAKEHARA "HIVISION ONSEI BASE BAND DENSO YO JUNSHUNJIASSIN DPCM HOSIKI" DENSI-JOHO-TSUSIN GAKKAI (Sho 62 March)).

Referring to the drawings, one example of the conventional audio signal demodulation circuits will be explained.

FIGS. 3, 4 and 5 are a block diagram of the conventional audio signal demodulation circuit, a timing chart thereof and a waveform chart thereof, respectively. In FIG. 3, 31 is a bit de-interleave circuit; 32 is an error correction circuit; 33 is a word de-interleave circuit; 34 is an expansion circuit; 35 is an range detection/error correction circuit; 36 is an interpolation circuit; 37 is an integration circuit; 38 is a synchronous detection circuit; and 39 is a muting circuit.

The operation of the audio signal demodulation circuit thus constructed will be explained with reference to FIGS. 3, 4 and 5.

First, an audio input signal at 1350 kb/s is detected in its synchronization pattern by the synchronous detection circuit 38 to be synchronized. The output (synchronization lock signal) from the synchronous detection circuit 38 is applied to the muting circuit 39 so that it is at a high level when the input is synchronized and at a low level if the input is not synchronized.

Also, the input audio signal is bit-de-interleaved on the transmission side by bit-de-interleave circuit 31. The output from the bit de-interleave circuit 31 is error-corrected by the error correction circuit 32 so that one-error correction two error detection is made in the normal mode and two-error correction three-error detection is made in the intensifying mode. The signal subjected to the two-error detection in the normal mode and the three-error detection in the intensifying mode will be used as an interpolation signal in the interpolation circuit 36.

The output from the error correction circuit 32 is word-de-interleaved on the transmission side by word-de-interleave circuit 33.

The output from the error correction circuit 32 is also detected in its range bits and error-detected by the range detection/error correction circuit 35.

The outputs from the word de-interleave circuit 33 is expanded by the expansion circuit 34 in accordance with the range bits detected by the range detection/error correction circuit 35.

The output from the expansion circuit 34 is subjected to the average value interpolation or the previous value interpolation by the previous sample value in the same channel using an interpolation signal output from the error correction circuit 32; a differential value is produced from the interpolation circuit 36. The differential value output from the interpolation circuit 36 is integrated by the integration circuit 37. If the synchronization lock signal output from the synchronous detection circuit 38 is at a low level owing to synchronization unlock, forcible muting or the like, the output from the muting circuit 39 is extracted as an audio signal at the low level.

The operation of the integration circuit 37 and the muting circuit 39 will be explained in further detail.

Now, it is assumed that the differential signal output from the interpolation circuit 36 has the values as shown in (a) of FIG. 4 (for simplicity of illustration, only the values for the same channel in two or four channels are shown). In (a) of FIG. 4, the abscissa represents time (sample No.) and the ordinate represents the differential signal output from the interpolation circuit 36. For example, the differential signal is 2 at time n and it is 3 at time n+1. The output from the integration circuit 37 is obtained by adding the differential value at the time at issue to the integrated value at the previous sampling time. Now, if the output from the integration circuit 37 is muted at time n+4 by the forcible muting, it is placed in the low level at time n+3 as shown in FIG. 5.

However, in the above arrangement, the audio signal is abruptly removed in the cases where the synchronization has been lost or the forcible muting is done so that noise 'puff' will be produced.

DISCLOSURE OF INVENTION

An object of the invention is to provide an audio signal demodulating circuit which can demodulate suitable sound for audiences without producing noise "puff" even if synchronization has been lost or forcible muting is done.

In order to attain the above object, the audio signal demodulating circuit according to the present invention comprises a synchronous detection circuit and a muting circuit for muting the output from an interpolation circuit using a synchronization lock signal produced from the synchronous detection circuit when synchronization has been lost.

In accordance with the above arrangement, the differential signal output from interpolation circuit is muted by the muting circuit using the synchronization lock signal at a low level output from the synchronous detection circuit so that sound free from noise can be produced even when synchronization has been lost or forcible muting is done.

DESCRIPTION OF THE PREFERRED EMBODIMENT

Figure 1:
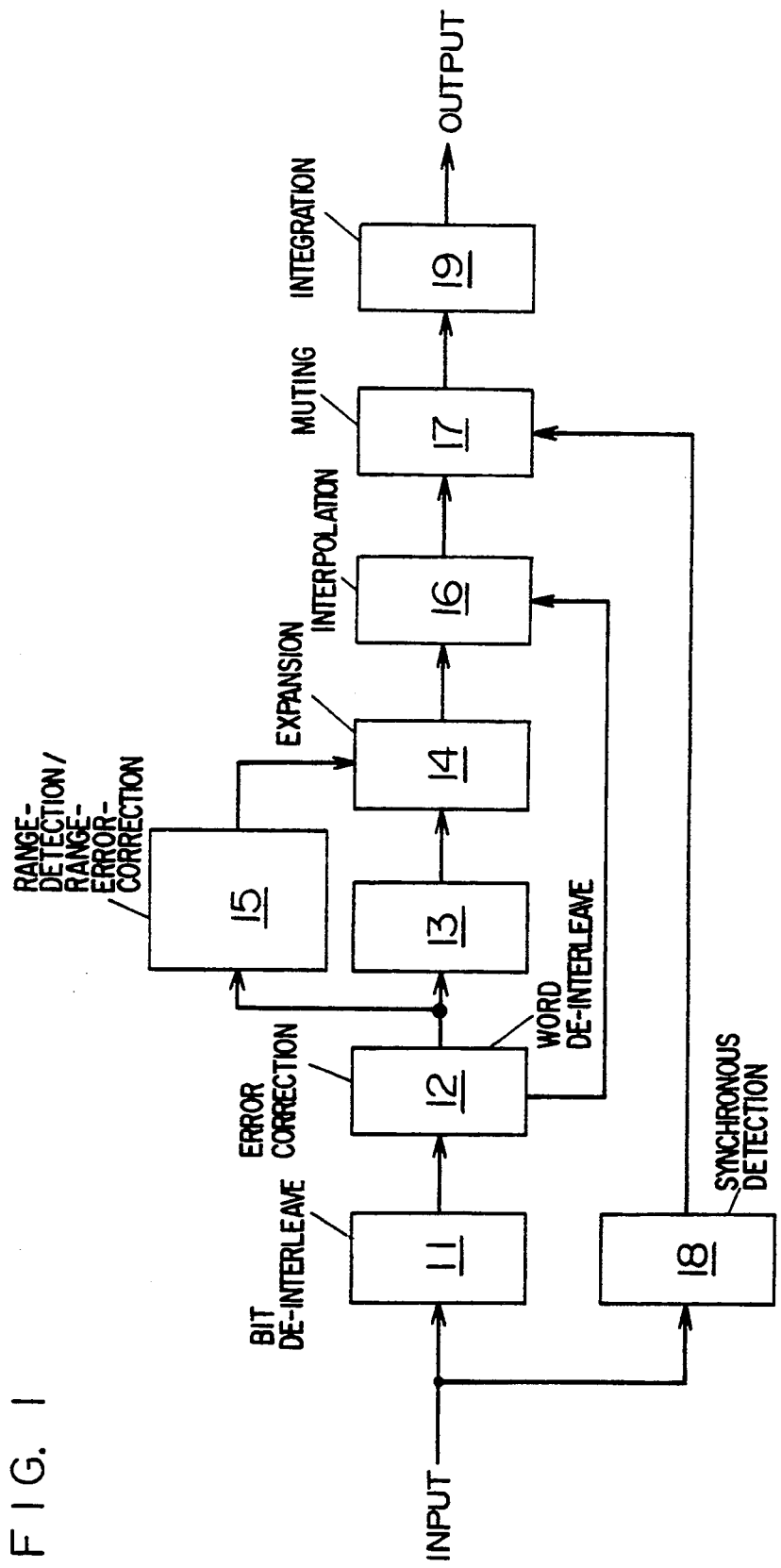
FIG. 1 is a block diagram of the audio signal demodulation circuit according to an embodiment of the present invention.

Referring to the drawings, explanation will be given for an embodiment of the audio signal demodulation circuit according to the present invention.

FIG. 1 is a block diagram of the audio signal demodulation circuit according to an embodiment of the present invention.

In FIG. 1, 11 is a bit de-interleave circuit; 12 is an error correction circuit; 13 is a word de-interleave circuit; 14 is an expansion circuit; 15 is a range detection/error correction circuit; 16 is an interpolation circuit; 17 is a muting circuit; 18 is a synchronous detection circuit; and 19 is an integration circuit.

Figure 3:
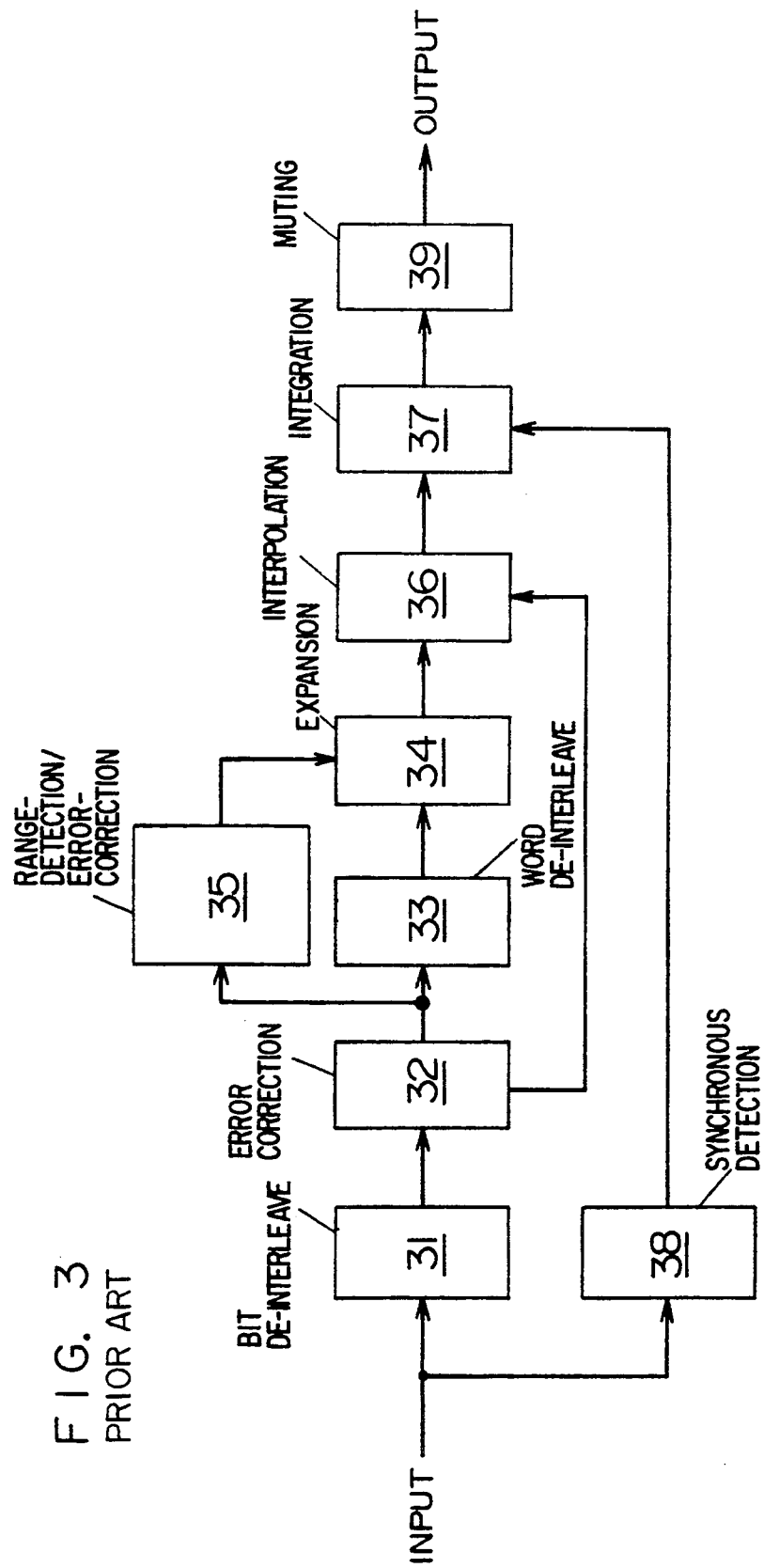
FIG. 3 is a block diagram of the conventional audio signal demodulation circuit.

The arrangement of FIG. 1 is different from the prior art arrangement of FIG. 3 in that the muting circuit 17 is located in front of the integration circuit 19.

Figure 2:
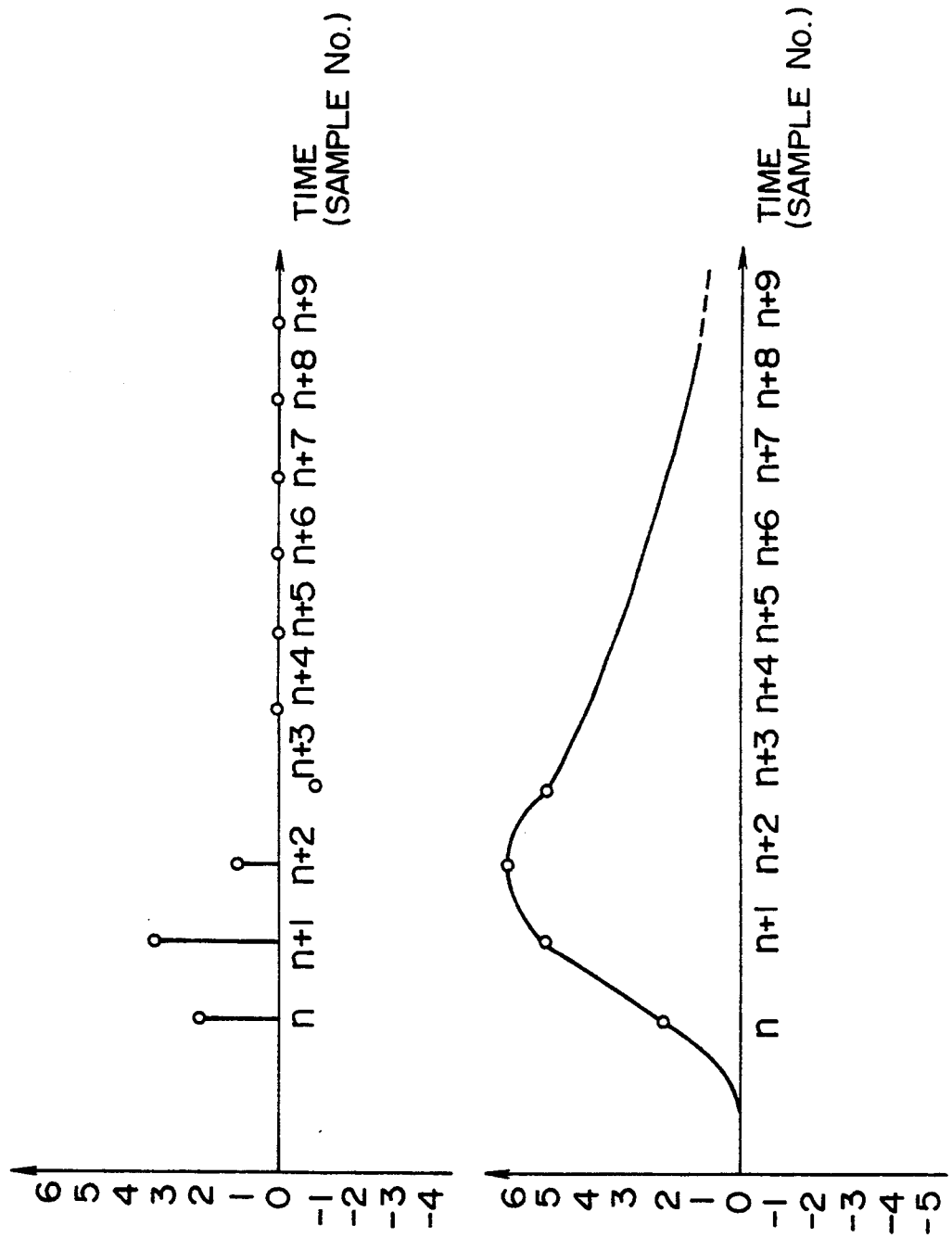
FIGS. 2(a) and 2(b) (collectively referred to herein as "FIG. 2") are waveform charts for explaining the operation of the audio signal demodulation circuit of FIG. 1.

The operation of the audio signal demodulation circuit thus constructed will be explained with reference to FIGS. 1 and 2.

First, an audio input signal at 1350 kb/s is detected in its synchronization pattern by the synchronous detection circuit 18 to take synchronization. The output (synchronization lock signal) from the synchronous detection circuit 18 is applied to the muting circuit 17 so that it is at a high level if the synchronization has been achieved while it is at a low level if the synchronization has not been achieved.

Also, the interleaving performed before transmission is canceled by a de-interleave process performed by the bit de-interleave circuit 11. The output from the bit de-interleave circuit 11 is error-corrected by the error correction circuit 12 so that one-error correction two error detection is made in the normal mode and two-error correction three-error detection is made in the intensifying mode. The signal subjected to the two-error detection in the normal mode and the three-error detection in the intensifying mode will be used as an interpolation signal in the interpolation circuit 16.

The output from the error correction circuit 12 is word-de-interleaved on the transmission side by word-de-interleave circuit 13.

The output from the error correction circuit 12 is also detected in its range bits and error-detected by the range detection/error correction circuit 15.

The output from the word de-interleave circuit 13 is expanded by the expansion circuit 14 in accordance with the range bits detected by the range detection/error correction circuit 15.

The output from the expansion circuit 14 is subjected to the average value interpolation or the previous value interpolation by the previous sample value in the same channel using an interpolation signal output from the error correction circuit 12; a differential value is produced from the interpolation circuit 16.

In only the case where the synchronization lock signal output from said synchronous detection circuit 18 is at a low level (owing to synchronization unlock, forcible muting, or the like), the differential signal output from the interpolation circuit 16 is placed in the low level by the muting circuit 17; in the other cases, the differential signal is passed through the muting circuit 17 as it is. The differential signal output from the muting circuit 17 is integrated to be demodulated as an audio signal.

Figures 4A, 4B:
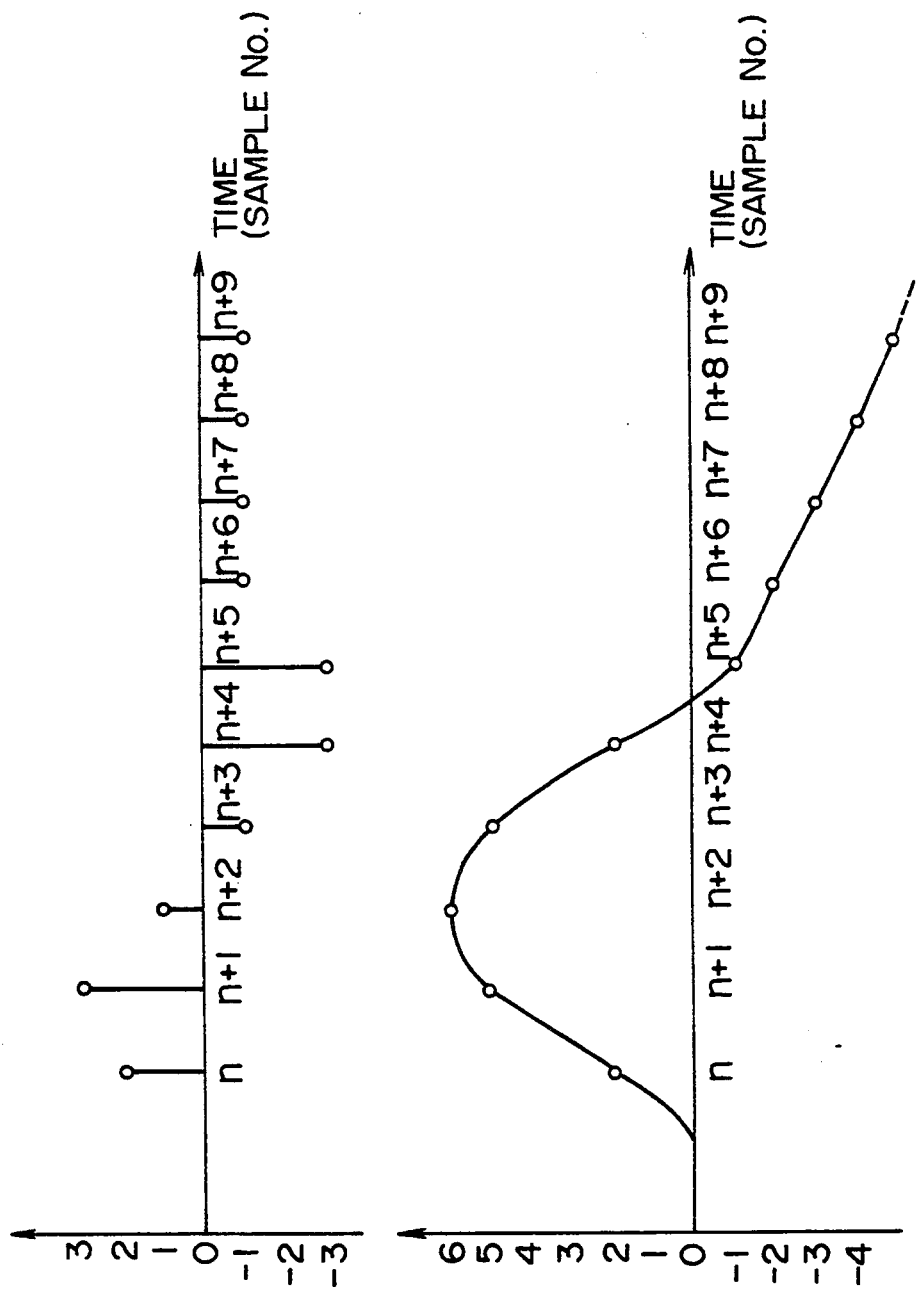
FIGS. 4(a) and 4(b) (collectively referred to herein as "FIG. 4") and FIG. 5 are waveform charts for explaining the operation of the audio signal demodulation circuit of FIG. 3.
Figure 5:
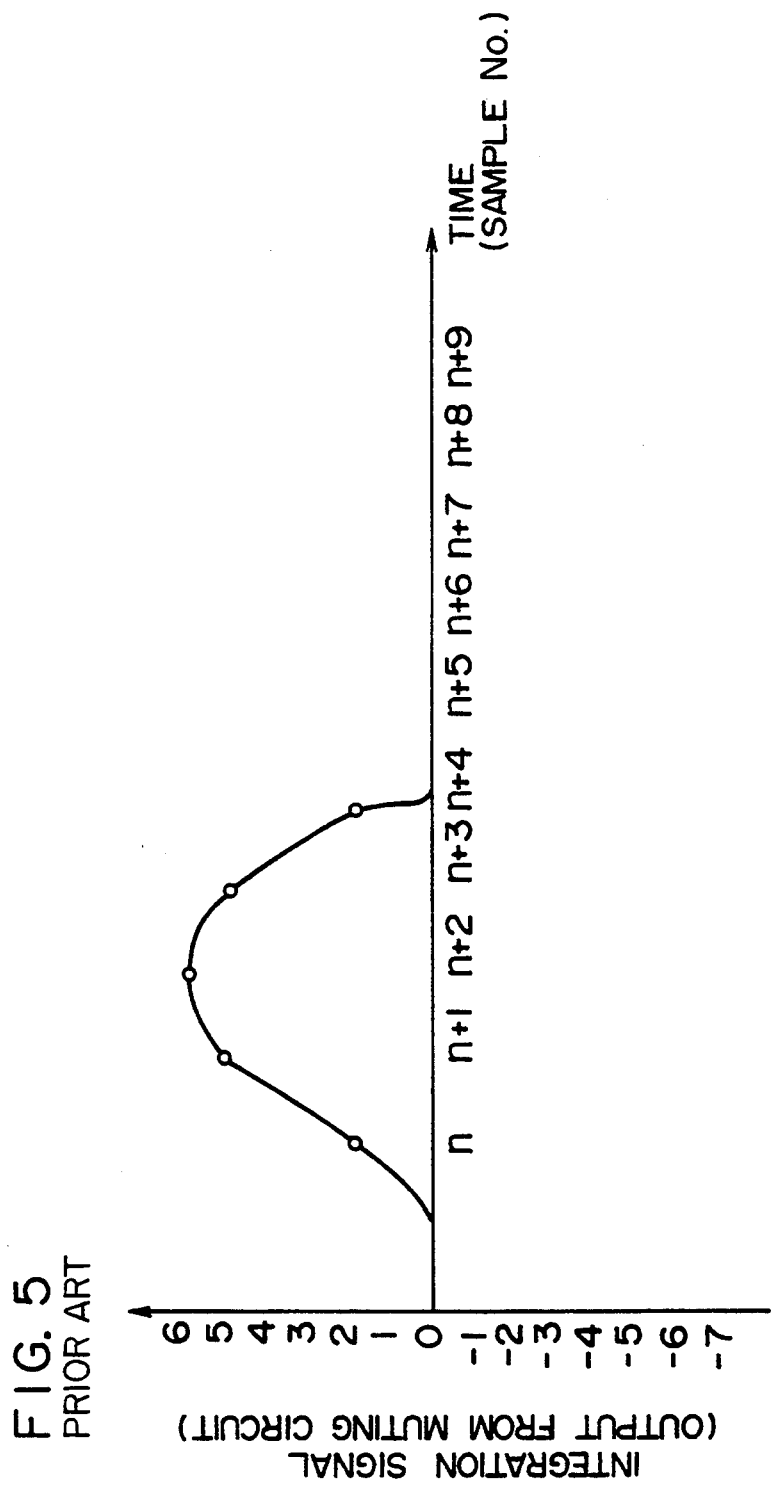

The operation of the muting circuit 17 and the integration circuit 19 will be explained in further detail. It is assumed as in the prior art that the differential signal output from the interpolation circuit 16 has the values as shown in FIG. 4(a) (the abscissa represents time (sample No.) and the ordinate represents the differential signal output from the interpolation circuit 16). As seen from FIG. 2(a), the differential signal is 2 at time n, and it is 3 at time n+1. When the differential signal is muted owing to forcible muting at time n+4, it is made zero by the muting circuit 17 during the forcible muting at time n+4 et seq. as shown in FIG. 2(a). The differential signal thus obtained from the muting circuit 17 will be integrated by the integration circuit 19. The output from the integration circuit 19, which is multiplied by the leak coefficient less than 1 in order to lessen deterioration of sound quality due to transmission error, will be attenuated gradually as shown in FIG. 2(b).

In accordance with the embodiment, the differential signal output from the interpolation circuit 16 is made zero by the muting circuit 17 so that sound can be output without producing noise such as 'puff' even when synchronization has been lost or forcible muting is done.

Accordingly, in accordance with the present invention, the differential signal output from the interpolation circuit is muted by the muting circuit and thereafter integrated by the integration circuit so that sound can be outputted without producing noise even when synchronization has been lost or forcible muting is done.

We claim:

1. An audio signal demodulator for demodulating an audio input signal received from a transmission side and for providing an audio output signal, the demodulator comprising:

synchronization detector means for detecting synchronization of the audio input signal, and for providing a synchronization lock signal which indicates whether or not synchronization has been achieved;

bit de-interleaving means, responsive to the audio input signal for canceling a bit interleaving operation performed at the transmission side, and for providing a bit-de-interleaved signal;

error correction means for error-correcting the bit-de-interleaved signal, and for providing a first signal and an interpolation signal;

word de-interleave means for receiving the first signal from the error correction means and for canceling a word interleaving operation performed at the transmission side, and for providing a word-de-interleaved signal;

means for detecting a range of, and for correcting range errors in, the first signal from the error correction means, and for providing range bits indicative of the detected range;

expansion means for expanding the word-de-interleaved signal in accordance with the range bits, and for providing an expanded signal;

means for interpolating the expanded signal in accordance with the interpolation signal from the error correction means, and for providing an interpolated signal;

means for selectively muting the interpolated signal based on the synchronization lock signal being in an unlock state, and for providing a switched interpolated signal; and means for integrating the switched interpolated signal to provide the audio output signal.

2. An audio signal demodulator for demodulating an audio input signal received from a transmission side and for providing an audio output signal, the demodulator comprising:

synchronization dtector means for detecting synchronization of the audio input signal, and for providing a synchronization lock signal which indicates whether or not synchronization has been achieved;

means for performing at least one error correction process on the audio input signal, and for providing an error-corrected signal;

means for selectively muting the error-corrected signal based on the synchronization lock signal being in an unlock state, and for providing a switched error-corrected signal; and means for integrating the switched error-corrected signal to provide the audio output signal.

3. An audio signal demodulator for demodulating an audio input signal received from a transmission side and for providing an audio output signal, the demodulator comprising:

synchronization detector means for detecting synchronization of the audio input signal, and for providing a synchronization lock signal which indicates whether or not synchronization has been achieved;

means for processing the audio input signal, and for providing a processed audio input signal;

means for selectively muting the processed audio input signal based on the synchronization lock signal being in an unlock state, and for providing a switched signal; and means for integrating the switched signal to provide the audio output signal.

4. A circuit for an audio signal demodulator for demodulating an audio input signal received from a transmission side and for providing an audio output signal, the demodulator having a synchronization circuit for detecting synchronization of the audio input signal and for providing a synchronization lock signal which indicates whether or not synchronization has been achieved, and circuitry for processing the audio input signal and for providing a processed audio input signal, the circuit comprising:

means for selectively muting the processed audio input signal based on the synchronization lock signal being in an unlock state, and for providing a switched signal; and means for integrating the switched signal to provide the audio output signal.

5. In an audio signal demodulator for demodulating an audio input signal received from a transmission side and for providing an audio output signal, the demodulator having:

synchronization detector means for detecting synchronization of the audio input signal, and for providing a synchronization lock signal which indicates whether or not synchronization has been achieved;

bit de-interleaving means, responsive to the audio input signal for canceling a bit interleaving operation performed at the transmission side, and for providing a bit-de-interleaved signal;

error correction means for error-correcting the bit-de-interleaved signal, and for providing a first signal and an interpolation signal;

word de-interleave means for receiving the first signal from the error correction means and for canceling a word interleaving operation performed at the transmission side, and for providing a word-de-interleaved signal;

means for detecting a range of, and for correcting range errors in, the first signal from the error correction means, and for providing range bits indicative of the detected range;

expansion means for expanding the word-de-interleaved signal in accordance with the range bits, and for providing an expanded signal; and means for interpolating the expanded signal in accordance with the interpolation signal from the error correction means, and for providing an interpolated signal;

the improvement comprising:

means for selectively muting the interpolated signal based on the synchronization lock signal being in an unlock state, and for providing a switched interpolated signal; and means for integrating the switched interpolated signal to provide the audio output signal.

6. In an audio signal demodulator for demodulating an audio input signal received from a transmission side and for providing an audio output signal, the demodulator having:

a synchronization detector for detecting synchronization of the audio input signal, and for providing a synchronization lock signal which indicates whether or not synchronization has been achieved; and means for processing the audio input signal, and for providing a processed audio input signal;

the improvement comprising:

means for selectively muting the processed audio input signal based on the synchronization lock signal being in an unlock state, and for providing a switched signal; and means for integrating the switched signal to provide the audio output signal.

* * * * *
* * * * *